United States Patent
Kuronen et al.

(10) Patent No.: US 11,613,718 B2
(45) Date of Patent: Mar. 28, 2023

(54) FUEL COMPOSITION AND METHOD FOR PRODUCING A FUEL COMPOSITION

(71) Applicant: Neste Oyj, Espoo (FI)

(72) Inventors: Markku Kuronen, Porvoo (FI); Ulla Kiiski, Porvoo (FI); Jenni Nortio, Porvoo (FI); Kati Sandberg, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 17/455,064

(22) Filed: Nov. 16, 2021

(65) Prior Publication Data
US 2022/0073834 A1 Mar. 10, 2022

Related U.S. Application Data

(63) Continuation of application No. 16/620,348, filed as application No. PCT/FI2018/050418 on Jun. 4, 2018, now Pat. No. 11,203,728.

(30) Foreign Application Priority Data

Jun. 7, 2017 (FI) .................................... 20175528

(51) Int. Cl.
*C10L 10/12* (2006.01)
*C10L 1/08* (2006.01)
*C10L 10/14* (2006.01)

(52) U.S. Cl.
CPC ............... *C10L 10/12* (2013.01); *C10L 1/08* (2013.01); *C10L 10/14* (2013.01);
(Continued)

(58) Field of Classification Search
CPC ..... C10G 2400/08; C10L 10/12; C10L 10/14; C10L 1/02; C10L 1/04; C10L 1/08;
(Continued)

(56) References Cited

U.S. PATENT DOCUMENTS

| 7,390,397 B2 | 6/2008 | Lamprecht et al. |
| 7,666,294 B2 | 2/2010 | Bauldreay et al. |

(Continued)

FOREIGN PATENT DOCUMENTS

| AU | 2010201903 A1 | 6/2010 |
| CN | 1780899 A | 5/2006 |

(Continued)

OTHER PUBLICATIONS

Finnish Search Report for Finnish Application No. 20175528 dated Nov. 10, 2017.
(Continued)

*Primary Examiner* — Ellen M Mcavoy
*Assistant Examiner* — Chantel L Graham
(74) *Attorney, Agent, or Firm* — Buchanan Ingersoll & Rooney PC

(57) ABSTRACT

A multipurpose fuel composition is disclosed which contains a petroleum derived jet fuel component and a renewable jet fuel component, wherein the multipurpose fuel composition has a freezing point of −40° C. or below, and an exemplary cetane number more than 40, preferably more than 45, more preferably more than 50.

20 Claims, 2 Drawing Sheets

(52) U.S. Cl.
CPC . *C10L 2200/043* (2013.01); *C10L 2200/0446* (2013.01); *C10L 2200/0484* (2013.01); *C10L 2270/026* (2013.01); *C10L 2270/04* (2013.01); *C10L 2290/24* (2013.01)

(58) Field of Classification Search
CPC ............. C10L 1/1616; C10L 2200/043; C10L 2200/0446; C10L 2200/0484; C10L 2270/026; C10L 2270/04; C10L 2290/24; Y02E 50/10; Y02T 50/678
See application file for complete search history.

(56) References Cited

U.S. PATENT DOCUMENTS

| | | | |
|---|---|---|---|
| 8,183,419 | B2 | 5/2012 | Lamprecht et al. |
| 9,505,986 | B2 | 11/2016 | Iguchi et al. |
| 2005/0109672 | A1 | 5/2005 | Bauldreay et al. |
| 2006/0111599 | A1 | 5/2006 | Lamprecht et al. |
| 2008/0244962 | A1* | 10/2008 | Abhari ................. C10L 3/12 208/15 |
| 2009/0013590 | A1 | 1/2009 | Lamprecht et al. |
| 2009/0277409 | A1* | 11/2009 | Selby .................. C10M 107/02 123/1 A |
| 2014/0051897 | A1 | 2/2014 | Peters et al. |
| 2015/0112106 | A1 | 4/2015 | Rockwell et al. |
| 2020/0190421 | A1 | 6/2020 | Kuronen et al. |

FOREIGN PATENT DOCUMENTS

| | | |
|---|---|---|
| CN | 1852967 A | 10/2006 |
| EP | 1664249 B1 | 11/2012 |

OTHER PUBLICATIONS

International Preliminary Report on Patentability (PCT/IPEA/409) dated Aug. 13, 2019, by the European Patent Office as the International Preliminary Examining Authority for International Application No. PCT/FI2018/050418.

International Search Report (PCT/ISA/210) dated Jul. 19, 2018, by the European Patent Office as the International Searching Authority for International Application No. PCT/FI2018/050418.

Written Opinion (PCT/ISA/237) dated Jul. 19, 2018, by the European Patent Office as the International Searching Authority for International Application No. PCT/FI2018/050418.

Office Action (Notification of the First Office Action) dated Mar. 19, 2021, by the Chinese Patent Office in corresponding Chinese Patent Application No. 2018800373713, and an English Translation of the Office Action, 15 pages.

Zhang, D., "Processing Technology for Sulfur-Containing Crude Oil", China Petrochemical Press, Jul. 30, 2003, p. 291.

\* cited by examiner

FUEL COMPOSITION AND METHOD FOR PRODUCING A FUEL COMPOSITION

FIELD OF THE INVENTION

The present disclosure relates to a fuel composition and a method for producing a fuel composition.

BACKGROUND

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

A Fischer-Tropsch (FT) process may be used to convert a mixture of carbon monoxide and hydrogen into liquid hydrocarbons. The process enables producing synthetic fuel from coal, natural gas, or biomass.

A gas to liquids (GTL) process is a refinery process that enables converting natural gas or other gaseous hydrocarbons into longer-chain hydrocarbons, such as gasoline or diesel fuel. Methane-rich gases may be converted into liquid synthetic fuels either via direct conversion or via syngas as an intermediate.

A freezing point of jet fuel is the lowest temperature at which the fuel remains free of solid hydrocarbon crystals that may restrict the flow of the fuel through filters, if present in the fuel system of the aircraft. The temperature of the fuel in the aircraft tank normally falls during flight depending on the aircraft speed, altitude, and flight duration. The freezing point of the fuel needs to be lower than the minimum (i.e. lowest) operational tank temperature.

EP 1664249 B1 discloses a fuel composition of petroleum derived kerosene fuel and FT-derived kerosene fuel, which composition has a lower freezing point than that of the fuel components.

SUMMARY

The following presents a simplified summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.

According to an aspect, there is provided the subject matter of the independent claims. Embodiments are defined in the dependent claims.

An exemplary multipurpose fuel composition comprises petroleum derived jet fuel component and renewable jet fuel component, wherein the multipurpose fuel composition has a freezing point of −40° C. or below, and a cetane number more than 40, preferably more than 45, more preferably more than 50.

An exemplary method comprises producing a multipurpose fuel composition, the method comprising mixing petroleum derived jet fuel component and renewable jet fuel component to obtain a multipurpose fuel composition having a freezing point of −40° C. or below, and a cetane number more than 40, preferably more than 45, more preferably more than 50.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the attached drawings, in which.

DETAILED DESCRIPTION OF EMBODIMENTS

Figure 1:
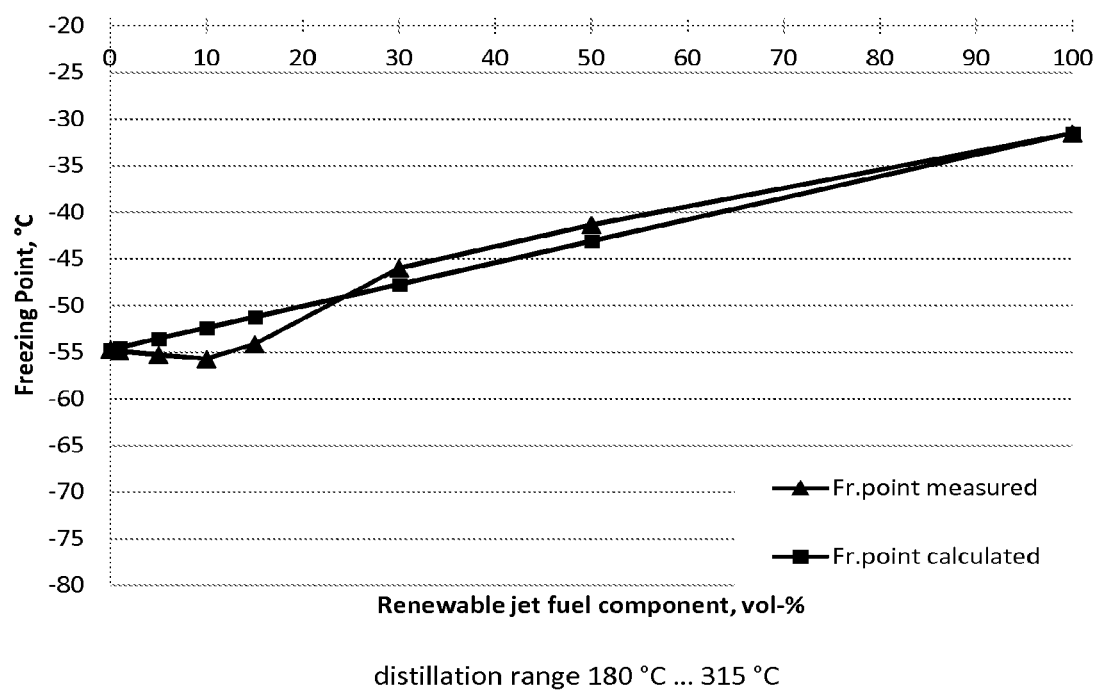
FIG. 1 shows measured and calculated freezing points of exemplary fuel compositions comprising a renewable jet fuel component having a distillation range from 180° C. to 315° C. blended with a petroleum derived jet fuel component.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising", "containing" and "including" should be understood as not limiting the described embodiments to consist of only those features that have been mentioned and such embodiments may contain also features/structures that have not been specifically mentioned.

Jet aircraft is exposed to low operating temperatures, and it is necessary that the fuel used in the aircraft does not freeze in these conditions. Blocking of fuel filters and pumpability of the jet fuel are dependent on the freezing point of the fuel. The Jet A fuel specification has limited the freezing point of the Jet A fuel to a maximum of −40° C. The Jet A-1 fuel specification has limited the freezing point of the Jet A-1 fuel to a maximum of −47° C.

Because jet fuel is a mixture of hundreds of individual hydrocarbons each having its own specific freezing point, jet fuel does not become solid at one temperature. When the fuel is cooled the hydrocarbons with the highest freezing point solidify first. Further cooling causes the hydrocarbons with a lower freezing point to solidify.

The quality of diesel fuel may be determined by using the cetane number (CN). The cetane number is an inverse function of the fuel's ignition delay, and a time period between the start of injection and the first identifiable pressure increase during combustion of the fuel. In a particular diesel engine, higher cetane fuels have shorter ignition delay periods than lower cetane fuels.

Gas-to-liquids (GTL) jet fuel is typically not used in diesel engines in ground vehicles. The properties of the GTL jet fuel (i.e. GTL kerosene), such as the cetane number, flash point and the distillation range are not suitable for modern diesel engine use.

An embodiment discloses a multipurpose fuel composition comprising petroleum derived jet fuel component and renewable jet fuel component.

In an embodiment the renewable jet fuel component is hydrotreated renewable middle distillate.

Another embodiment discloses a multipurpose fuel composition comprising a petroleum derived jet fuel component and a renewable jet fuel component with a distillation range from 145° C. to 315° C.

Another embodiment discloses a multipurpose fuel composition comprising a petroleum derived jet fuel component and a renewable jet fuel component with a distillation range from 145° C. to 280° C.

Another embodiment discloses a multipurpose fuel composition comprising a petroleum derived jet fuel component and a renewable jet fuel component with a distillation range from 180° C. to 315° C.

Thus an embodiment discloses a multipurpose fuel composition which is a blend of a petroleum derived jet fuel component and renewable jet fuel component, and which is usable as a fuel in both aircrafts and ground vehicles. The resulting blend has a better (i.e. lower) freezing point than the neat components. This enables utilization of fuel components with a poorer (i.e. higher) freezing point. The cetane number of the multipurpose fuel composition is high enough so the composition may be used in diesel engines.

Petroleum derived jet component typically comprises C7 to C15 hydrocarbons or C8 to C16 hydrocarbons, for example. The amount of such hydrocarbons may be more than about 95 wt-% of the component, or more than about 99 wt-% of the component. Petroleum derived jet fuel component typically comprises i-paraffins, n-paraffins, naphthenes, and/or aromatics. In the petroleum derived jet fuel component, the amount of i-paraffins is typically about 15 to about 35 wt-%, or about 20 to about 30 wt-%, such as about 25 wt-%. In the petroleum derived jet fuel component, the amount of n-paraffins is typically about 10 wt-% to about 30 wt %, or about 15 wt-% to about 25 wt-%, such as about 20 wt-%. In the petroleum derived jet fuel component, the amount of naphthenes is typically about 15 wt-% to about 35 wt-%, or about 20 wt-% to about 30 wt-%, such as about 25 wt-%. In the petroleum derived jet fuel component, the amount of aromatics is typically about 20 wt-% to about 40 wt-%, or about 25 wt-% to about 35 wt-%, such as about 30 wt-%.

Renewable jet fuel component typically comprises i-paraffins and n-paraffins and only a minor amount of other compounds. In the renewable jet fuel component, the amount of i-paraffins is typically more than about 50 wt-%, more than about 60 wt-%, more than about 70 wt-%, more than about 80 wt-%, or more than about 90 wt-%. Typically the amount of C15 to C18 paraffins in the renewable jet fuel component is more than about 70 wt-%, more than about 85 wt-%, or more than about 90 wt-%. In the renewable jet fuel component, the amount of paraffins smaller than C15 paraffins is typically less than about 20 wt-%, less than about 10 wt %, or less than about 7 wt-%. In the renewable jet fuel component, the amount of paraffins larger than C18 paraffins is typically less than about 10 wt-%, less than about 5 wt-%, or less than about 3 wt-%. The amounts of C15, C16, C17 and C18 hydrocarbons may vary in the renewable jet fuel component.

An embodiment discloses a fuel composition with a predefined freezing point (or freezing point range) and predefined cetane number (or cetane number range).

An embodiment discloses a fuel composition with a predefined combination of freezing point (or freezing point range) and cetane number (or cetane number range).

An embodiment discloses a multipurpose fuel composition comprising petroleum derived jet fuel component and renewable jet fuel component, wherein the freezing point of the multipurpose fuel composition is −40° C. or below, and the cetane number of the multipurpose fuel composition is more than 40, preferably more than 45, more preferably more than 50.

An embodiment discloses a method for producing a fuel composition, the method comprising mixing petroleum derived jet fuel component and renewable jet fuel component in an amount to obtain a multipurpose fuel composition having a freezing point −40° C. or below and a cetane number of more than 40.

An embodiment discloses a multipurpose fuel composition comprising petroleum derived jet fuel component and renewable jet fuel component, wherein the freezing point of the multipurpose fuel composition is −47° C. or below.

An embodiment discloses a method for producing a fuel composition, the method comprising mixing petroleum derived jet fuel component and renewable jet fuel component in an amount to obtain a multipurpose fuel composition having a cetane number of more than 50.

The cetane number of the blend may be obtained by linear calculations from the cetane numbers of the blended components.

An embodiment discloses a fuel which is a blend (i.e. mixture) of 1) a petroleum derived jet fuel component, and 2) a renewable jet fuel component. An exemplary fuel is usable as a multipurpose fuel, i.e. it is usable both as diesel fuel (e.g. in ground vehicles) and as jet fuel (e.g. in aircrafts), since the cetane number of the fuel composition is such that it allows the use of the fuel composition in ground vehicles (such as cars, trucks etc.) in addition to the use in aircrafts. This is logistically beneficial, for example, in remote areas or crisis situations when it may be laborious to provide diesel fuel and jet fuel separately.

An exemplary fuel composition has a lower freezing point than that of the components. Thus the freezing point of the fuel composition may be upgraded by utilizing renewable fuel components in jet fuel and multipurpose fuel manufacturing and blending. For example, when blending the petroleum derived jet fuel component and the renewable jet fuel component, the freezing point requirement of Jet A-1 grade (maximum freezing point −47° C.) may be fulfilled even though the fuel components were only of Jet A grade (maximum freezing point −40° C.).

A difference between the renewable jet fuel component and GTL kerosene is that the GTL kerosene (i.e. GTL jet fuel) has an iso-paraffin content from 20 wt % to 50 wt-%, whereas the renewable jet fuel component has an iso-paraffin content of more than 70 wt-%, preferably more than 80 wt-%, more preferably more than 90 wt-%.

A further difference between the renewable jet fuel component and GTL kerosene is that the GTL kerosene (i.e. GTL jet fuel) has a freezing point of −42.5° C. to −53.5° C. and a flash point of 42° C. to 48.5° C., whereas the renewable jet fuel component typically has a freezing point of −29° C. to −33° C. and typically a flash point above 61° C.

Table 1 discloses physical properties of the renewable jet fuel component in comparison with conventional GTL kerosene.

TABLE 1

Comparison between renewable jet fuel component
and conventional GTL kerosene component

|  | Renewable jet fuel component | GTL kerosene component |
|---|---|---|
| Distillation range (° C.) | 180 . . . 315 | 130 . . . 300 |
| Density (kg/m$^3$) | 780 | 730 . . . 770 |

In order to achieve the advantageous freezing point lowering phenomena of the fuel composition, there are requirements for the conventional petroleum derived jet fuel component and renewable jet fuel component, since it is required that the difference between the freezing points of the components used is less than 25° C.

The renewable jet fuel component herein refers to a jet fuel component produced from vegetable oil and/or animal fats. Palm oil, rapeseed oil, and/or waste fat from the food industry may be used as a raw material for the production of the renewable jet fuel component. Other examples of possible raw materials include waste fats from the food industry, biogas, algae oil, jatropha oil, soybean oil, and/or microbial oil. Examples of possible waste fats from the food industry include cooking oil, animal fat, and/or fish fat.

Renewable fuel refers to biofuel produced from biological resources formed through contemporary biological processes. Herein the renewable jet fuel component is produced from vegetable oil and/or animal fat.

In an embodiment, the renewable jet fuel component is produced by means of a hydrotreatment process. Hydrotreatment involves various reactions where molecular hydrogen reacts with other components, or the components undergo molecular conversions in the presence of molecular hydrogen and a solid catalyst. The reactions include, but are not limited to, hydrogenation, hydrodeoxygenation, hydrodesulfurization, hydrodenitrification, hydrodemetallization, hydrocracking, and isomerization. The renewable jet fuel component may have different distillation ranges which provide the desired properties to the component, depending on the intended use.

In an embodiment, the freezing point of the multipurpose fuel composition is −55° C. or below, preferably −55.2° C. or below, more preferably −55.6° C. or below, yet more preferably −55.9° C. or below, yet more preferably −57.4° C. or below, yet more preferably −58.2° C. or below.

In an embodiment, the multipurpose fuel composition comprises at least 1 vol-% of renewable jet fuel component, preferably at least 5 vol-%, more preferably at least 10 vol-%, yet more preferably at least 15 vol-%, yet more preferably at least 15 vol-%, yet more preferably at least 50 vol-%.

In an embodiment, the petroleum derived jet fuel component has a freezing point between −47° C. and −60° C., wherein the difference between the freezing point of the renewable jet fuel component and the freezing point of the petroleum derived jet fuel component is less than 25° C.

Example 1

The freezing points of multipurpose fuel compositions were measured using a test method IP 529. The measured freezing points of the fuel compositions were compared to freezing points calculated by linear calculations (i.e. based on the volume percentages of the components in the fuel composition).

It was noticed that fuel compositions comprising renewable jet fuel component with a distillation range from 180° C. to 315° C., blended with a petroleum derived jet fuel component had a better (i.e. lower) freezing point than predicted according to linear calculations (see Table 2 and FIG. 1). This effect was seen when the amount of the renewable jet fuel component in the blends was 20 vol-% or less.

When renewable jet fuel component having a distillation range from 145° C. to 280° C. was blended with a petroleum derived jet fuel component (see Table 3, FIG. 2, Table 4), the lowering of the freezing point was even bigger, and the effect was seen with up to over 50 vol-% of renewable jet fuel component in the blend.

The freezing point lowering phenomena of the blend was detected when the petroleum derived jet fuel had a freezing point between −47° C. and −60° C., and when the difference between the renewable fuel freezing point and petroleum derived jet fuel freezing point was less than 25° C.

TABLE 2

Measured and calculated freezing points of fuel compositions
comprising renewable jet fuel component with distillation range
180° C.-315° C. blended with petroleum derived jet fuel component

| Renewable jet fuel content (vol-%) | Measured freezing point (° C.) | Calculated freezing point, linear (° C.) | Difference (° C.) |
|---|---|---|---|
| 0 | −54.7 | −54.7 | 0.0 |
| 1 | −54.9 | −54.5 | 0.4 |
| 5 | −55.3 | −53.5 | 1.8 |
| 10 | −55.7 | −52.4 | 3.3 |
| 15 | −54.1 | −51.2 | 2.9 |
| 30 | −46.0 | −47.7 | −1.7 |
| 50 | −41.3 | −43.1 | −1.8 |
| 100 | −31.5 | −31.5 | 0.0 |

TABLE 3

Measured and calculated freezing points of fuel compositions
comprising renewable jet fuel component with distillation range
145° C.- 280° C. blended with petroleum derived jet fuel component

| Renewable jet fuel content (vol-%) | Measured freezing point (° C.) | Calculated freezing point, linear (° C.) | Difference (° C.) |
|---|---|---|---|
| 0 | −54.7 | −54.7 | 0.0 |
| 1 | −55 | −54.7 | 0.3 |
| 5 | −55.2 | −54.5 | 0.7 |
| 10 | −55.6 | −54.3 | 1.3 |
| 15 | −55.9 | −54.1 | 1.8 |
| 30 | −57.4 | −53.6 | 3.8 |
| 50 | −58.2 | −52.8 | 5.4 |
| 100 | −50.9 | −50.9 | 0.0 |

TABLE 4

Measured and calculated freezing points of fuel compositions
comprising renewable jet fuel component with distillation range
145° C.- 280° C. blended with petroleum derived jet fuel component

| Renewable jet fuel component content (vol-%) | Measured freezing point ( C.) | Calculated freezing point (° C.) | Difference (° C.) |
|---|---|---|---|
| 0 | −59.0 | −59.0 | 0.0 |
| 50 | −57.1 | −55.4 | 1.7 |
| 100 | −51.8 | −51.8 | 0.0 |

FIG. 1 shows measured and calculated freezing points for a fuel composition comprising renewable jet fuel component with a distillation range from 180° C. to 315° C. blended with petroleum derived jet fuel component.

Figure 2:
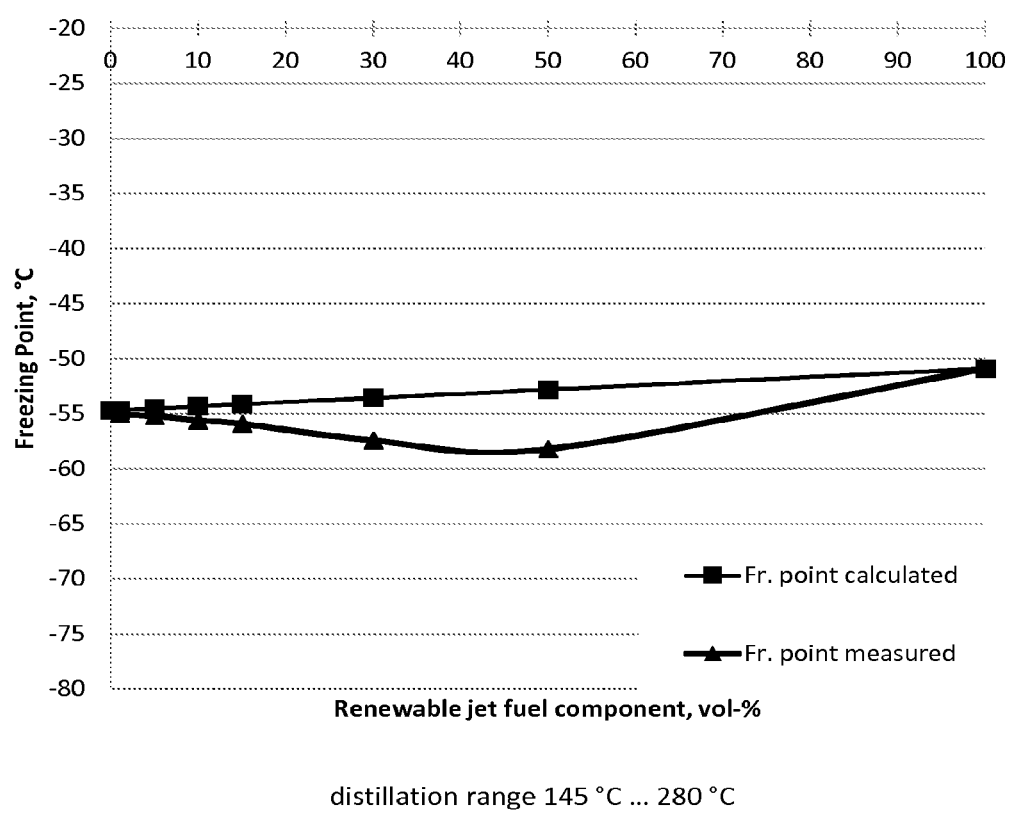
FIG. 2 show measured and calculated freezing points of exemplary fuel compositions comprising a renewable jet fuel component having a distillation range from 145° C. to 280° C. blended with a petroleum derived jet fuel component.

FIG. 2 shows measured and calculated freezing points for a fuel composition comprising renewable jet fuel component with a distillation range from 145° C. to 280° C. blended with petroleum derived jet fuel component. Cetane numbers of the multipurpose fuel compositions containing renewable jet fuel component and petroleum derived jet fuel component were measured using the EN15195 method. The results obtained are presented in Table 5. Table 5 shows the content of renewable jet fuel component (RJF) in the fuel composition, as well as the cetane number of the fuel composition. The results show that cetane numbers behave linearly. Therefore, the cetane number of the multipurpose fuel composition may be calculated from the cetane numbers of the renewable jet fuel component and petroleum derived jet fuel component, as presented in Table 6.

TABLE 5

Cetane numbers of blends containing petroleum derived jet fuel component and renewable jet fuel component having a distillation range from 180° C. to 315° C.

| | RJF content (vol-%) | | | |
|---|---|---|---|---|
| | 100 | 30 | 15 | 0 |
| Cetane number | 77.2 | 52.7 | 48.2 | 43.1 |

TABLE 6

Calculated cetane numbers for blends containing petroleum derived jet fuel component and renewable jet fuel component having a distillation range from 145° C. to 280° C.

| | RJF content (vol-%) | | | |
|---|---|---|---|---|
| | 100 | 30 | 15 | 0 |
| Cetane number | 61.5 | 48.62 | 45.95 | 43.2 |

The example 1 shows the superior freezing point behavior of the renewable jet fuel based blending component. This behavior was seen with up to 20 vol-% renewable jet fuel component in the blend with conventional petroleum derived jet fuel. Similar kind of superior freezing point behaviour was also shown with the renewable jet fuel component with a slightly lower distillation range. The superior freezing point behaviour was seen with up to over 50 vol-% renewable jet fuel component in the blend with conventional petroleum derived jet fuel component.

The freezing points and cetane numbers of the multipurpose compositions are such that they may be used in aircrafts as well as in ground vehicles.

Example 2 (Comparative Example)

The freezing points of fuel compositions were measured using a test method IP 529. The measured freezing points of the fuel compositions were compared to freezing points calculated by linear calculations (i.e. based on the volume percentages of the components in the fuel composition). It was noticed that fuel compositions comprising renewable jet fuel component with a freezing point of −31.5° C., blended with a petroleum derived jet fuel component with a freezing point of −73.3° C., did not have a better freezing point than predicted according to linear calculations (see Table 7).

TABLE 7

Measured and calculated freezing points of renewable jet fuel component and petroleum derived jet fuel component blends

| Renewable jet fuel component content (vol-%) | Measured freezing point (° C.) | Calculated freezing point (° C.) | Difference (° C.) |
|---|---|---|---|
| 100 | −31.5 | −31.5 | 0.0 |
| 50 | −41.7 | −52.4 | −10.7 |
| 30 | −47.4 | −60.8 | −13.4 |
| 15 | −53.4 | −67.0 | −13.6 |
| 10 | −57.2 | −69.1 | −11.9 |
| 5 | −62.8 | −71.2 | −8.4 |
| 1 | −73.0 | −72.9 | 0.1 |
| 0 | −73.3 | −73.3 | 0.0 |

It will be obvious to a person skilled in the art that, as the technology advances, the inventive concept can be implemented in various ways. The invention and its embodiments are not limited to the examples described above but may vary within the scope of the claims.

The invention claimed is:

1. A ground vehicle diesel and aircraft jet fuel composition having a freezing point of −40° C. or below, and a cetane number more than 40, wherein the ground vehicle diesel and aircraft jet fuel composition is a mixture of:
   a petroleum derived jet fuel; and
   a renewable jet fuel,
   wherein the renewable jet fuel has a distillation range from 145° C. to 315° C.,
   wherein the petroleum derived jet fuel has a freezing point between −47° C. and −60° C.,
   wherein a difference between the freezing point of the renewable jet fuel and the freezing point of the petroleum derived jet fuel is less than 25° C.,
   such that the ground vehicle diesel and aircraft jet fuel composition is usable as ground vehicle diesel fuel and as aircraft jet fuel,
   wherein the renewable jet fuel has an iso-paraffin content of more than 70 wt-%,
   wherein the renewable jet fuel contains:
      more than about 70 wt-% of C15 to C18 paraffins;
      less than about 20 wt-% of paraffins smaller than C15 paraffins; and
      less than about 10 wt-% of paraffins larger than C18 paraffins,
   wherein the renewable jet fuel is a jet fuel produced from biological sources and/or waste fat by means of hydrogenation, hydrodeoxygenation, hydrodesulfurization, hydrodenitrification, hydrodemetallization, hydrocracking and/or isomerization,
   wherein renewable jet fuel content of the ground vehicle diesel and aircraft jet fuel composition is at least 1 vol-%.

2. The composition as claimed in claim 1, wherein the renewable jet fuel is a derivative of vegetable oil, animal fat, fish fat, palm oil, rapeseed oil, cooking oil, waste fat from the food industry, biogas, algae oil, jatropha oil, soybean oil, and/or microbial oil.

3. The composition as claimed in claim 1, wherein the composition has a cetane number more than 45.

4. The composition as claimed in claim 1, wherein the composition has a cetane number more than 50.

5. The composition as claimed in claim 1, wherein the renewable jet fuel distillation range is from 145° C. to 280° C.

6. The composition as claimed in claim 1, wherein the renewable jet fuel distillation range is from 180° C. to 315° C.

7. The composition as claimed in claim 1, wherein the renewable jet fuel iso-paraffin content is more than 80 wt-%.

8. The composition as claimed in claim 1, wherein the renewable jet fuel iso-paraffin content is more than 90 wt-%.

9. The composition as claimed in claim 1, wherein the renewable jet fuel contains at least one of:
more than about 85 wt-% of C15 to C18 paraffins,
less than about 10 wt-% of paraffins smaller than C15, and
less than about 5 wt-% paraffins larger than C18.

10. The composition as claimed in claim 1, wherein the renewable jet fuel contains at least one of:
more than about 90 wt-% of C15 to C18 paraffins,
less than about 7 wt-% of paraffins smaller than C15, and
less than about 3 wt-% paraffins larger than C18.

11. The composition as claimed in claim 1, wherein the freezing point of the composition is −47° C. or below.

12. The composition as claimed in claim 1, wherein the freezing point of the composition is −55° C. or below.

13. The composition as claimed in claim 1, wherein the freezing point of the composition is −55.2° C. or below.

14. The composition as claimed in claim 1, wherein the freezing point of the composition is −55.6° C. or below.

15. The composition as claimed in claim 1, wherein the freezing point of the composition is −55.9° C. or below.

16. The composition as claimed in claim 1, wherein the composition comprises:
at least 5 vol-% renewable jet fuel.

17. The composition as claimed in claim 1, wherein the composition comprises:
at least 10 vol-% renewable jet fuel.

18. The composition as claimed in claim 1, wherein the composition comprises:
at least 15 vol-% renewable jet fuel.

19. The composition as claimed in claim 1, wherein the composition comprises:
at least 50 vol-% renewable jet fuel.

20. A multipurpose fuel composition for a jet aircraft engine and ground vehicle diesel engine, the composition having a freezing point of −40° C. or below, and a cetane number more than 40, and comprising:
a petroleum derived jet fuel; and
a renewable jet fuel, the renewable jet fuel having iso-paraffin content of more than 70 wt-% and containing:
more than about 70 wt-% of C15 to C18 paraffins;
less than about 20 wt-% of paraffins smaller than C15 paraffins; and
less than about 10 wt-% of paraffins larger than C18 paraffins,
wherein the renewable jet fuel is a derivative of vegetable oil, animal fat, fish fat, palm oil, rapeseed oil, cooking oil, waste fat from the food industry, biogas, algae oil, jatropha oil, soybean oil, and/or microbial oil, wherein the renewable jet fuel is a jet fuel produced from biological sources and/or waste fat by means of hydrogenation, hydrodeoxygenation, hydrodesulfurization, hydrodenitrification, hydrodemetallization, hydrocracking and/or isomerization,
wherein renewable jet fuel content of the composition is at least 1 vol-%.

* * * * *